(12) United States Patent
Polese Cossio et al.

(10) Patent No.: US 11,176,238 B2
(45) Date of Patent: Nov. 16, 2021

(54) CREDENTIAL FOR A SERVICE

(71) Applicant: Hewlett-Packard Development Company, L.P., Houston, TX (US)

(72) Inventors: Lucio Polese Cossio, Porto Alegre (BR); Fernanda Maira Gallina, Porto Alegre (BR); Renato Oliveira da Silva, Porto Alegre (BR); Alan Brochier, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 337 days.

(21) Appl. No.: 16/095,757

(22) PCT Filed: Jul. 12, 2016

(86) PCT No.: PCT/US2016/041897
§ 371 (c)(1),
(2) Date: Oct. 23, 2018

(87) PCT Pub. No.: WO2018/013089
PCT Pub. Date: Jan. 18, 2018

(65) Prior Publication Data
US 2020/0336476 A1    Oct. 22, 2020

(51) Int. Cl.
*G06F 21/35*     (2013.01)
*H04L 29/06*     (2006.01)
(Continued)

(52) U.S. Cl.
CPC ............ *G06F 21/35* (2013.01); *H04L 63/083* (2013.01); *H04L 63/0853* (2013.01);
(Continued)

(58) Field of Classification Search
None
See application file for complete search history.

(56) References Cited

U.S. PATENT DOCUMENTS 9,071,967 B1 *  6/2015  Davies .............. H04W 12/0609
9,253,180 B2    2/2016  Thun
(Continued)

FOREIGN PATENT DOCUMENTS

CN   101133421   2/2008
CN   102638454   8/2012
(Continued)

OTHER PUBLICATIONS

Everykey Wants to Put Your Passwords on Your Wrist, 2014, http://techcrunch.com/2014/11/08/everykey/~7 pages.
(Continued)

*Primary Examiner* — Esther B. Henderson
(74) *Attorney, Agent, or Firm* — Trop Pruner & Hu PC

(57) ABSTRACT

In some examples, a mobile device registers an account of a first service with an account control service, the account control service separate from the first service. In response to the mobile device being authorized with respect to the account control service, the mobile device searches for a target device that is within a communication range of the mobile device. The mobile device transmits, to the target device found in the search, a credential of the account of the first service being accessed by the target device over a network.

15 Claims, 6 Drawing Sheets

(51) Int. Cl.
  *H04L 29/08*    (2006.01)
  *H04W 12/63*   (2021.01)
  *H04W 12/06*   (2021.01)
  *H04W 12/069*  (2021.01)

(52) U.S. Cl.
  CPC ........ *H04L 63/0876* (2013.01); *H04L 63/102* (2013.01); *H04L 63/107* (2013.01); *H04L 67/02* (2013.01); *H04L 67/143* (2013.01); *H04L 67/16* (2013.01); *H04W 12/068* (2021.01); *H04W 12/069* (2021.01); *H04W 12/63* (2021.01)

(56) References Cited

U.S. PATENT DOCUMENTS

| | | | |
|---|---|---|---|
| 9,942,750 B2 * | 4/2018 | McDonald | H04L 63/0815 |
| 2006/0015358 A1 * | 1/2006 | Chua | G06Q 20/02 |
| | | | 705/44 |
| 2006/0236382 A1 * | 10/2006 | Hinton | G06F 21/41 |
| | | | 726/8 |
| 2011/0150221 A1 | 6/2011 | Kitada et al. | |
| 2012/0239936 A1 * | 9/2012 | Holtmanns | H04L 9/3263 |
| | | | 713/176 |
| 2014/0007205 A1 | 1/2014 | Oikonomou | |
| 2014/0208112 A1 | 7/2014 | McDonald et al. | |
| 2014/0259115 A1 | 9/2014 | Bakshi et al. | |
| 2014/0298432 A1 | 10/2014 | Brown | |
| 2014/0317708 A1 | 10/2014 | Adrangi et al. | |
| 2015/0029866 A1 | 1/2015 | Liao et al. | |
| 2015/0058191 A1 | 2/2015 | Khan et al. | |
| 2015/0096001 A1 | 4/2015 | Morikuni et al. | |
| 2015/0310452 A1 | 10/2015 | Baitch et al. | |
| 2015/0371026 A1 | 12/2015 | Gnanasekaran | |
| 2016/0057139 A1 | 2/2016 | McDonough | |
| 2016/0261654 A1 * | 9/2016 | Trinh | H04W 4/21 |

FOREIGN PATENT DOCUMENTS

| | | |
|---|---|---|
| CN | 102656841 | 9/2012 |
| CN | 103067338 | 4/2013 |
| CN | 104221349 | 12/2014 |
| JP | 2002-157226 | 5/2002 |
| JP | 2006-195716 | 7/2006 |
| JP | 2008-098893 | 4/2008 |
| WO | WO-2009/107219 | 9/2009 |
| WO | WO-2013/158653 | 10/2013 |
| WO | WO-2015/119614 | 8/2015 |

OTHER PUBLICATIONS http://completelykeyless.com/Bluetooth-keyless-start/—Bluetooth Keyless Start—Completely Keyless downloaded Jun. 17, 2016 (4 pages).
https://lastpass.com/—A Simple Password Solution—downloaded Jun. 17, 2016 (7 pages).

* cited by examiner

CREDENTIAL FOR A SERVICE

BACKGROUND

A user can use an electronic device to access a service at a remote server. To access the service, the user may have to enter a credential, including a username and a password, for example. Once the credential is received at the service and verified, an active session can be established between the electronic device and the service.

BRIEF DESCRIPTION OF THE DRAWINGS

Some implementations of the present disclosure are described with respect to the following figures.

DETAILED DESCRIPTION

Figure 1:
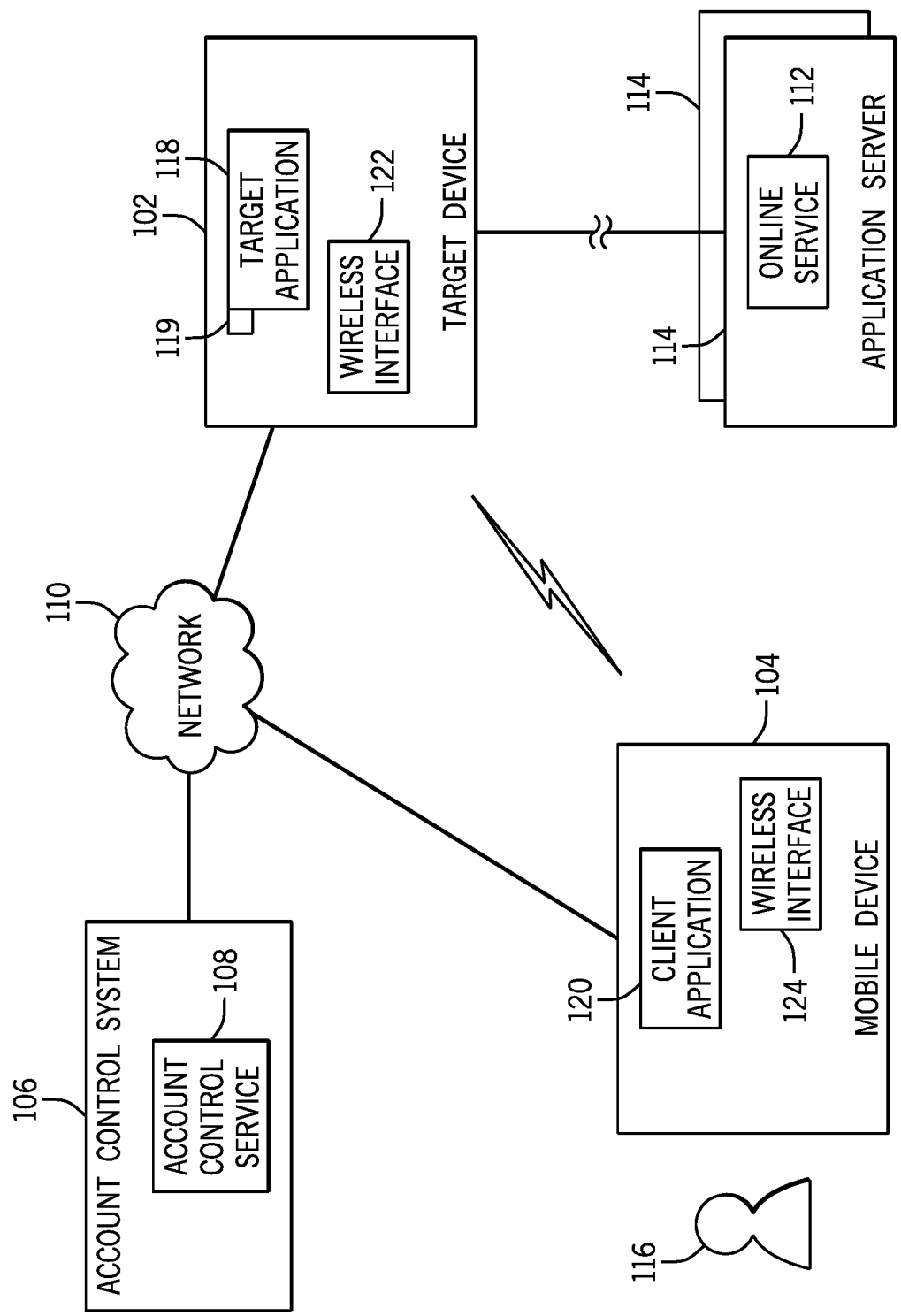
FIG. 1 is a block diagram of an arrangement that includes a mobile device, a target device, and an account control service, according to some examples.

A user can have multiple accounts with respective different network-accessible services, including any or some combination of the following services: a social networking service, an online gaming service, a banking service, an email service, a satellite or cable television service, or any other service that can be provided at a remote server and accessible by a user over a network. A network-accessible service can refer to a service that is accessible over a network, which can be a wired network, a wireless network, or a combination of both. In the present disclosure, a network-accessible service is referred to as an "online service," or more simply, a "service."

A user can set up an account with an online service. In some examples, an account of an online service can refer a collection of information that specifies feature(s) of the online service that is (are) accessible by a specific user, any restrictions on use of the online service, files or documents associated with the specific user, and information (in the form of a credential) that is to be used to access the online service. More generally, an account of an online service refers to information that allows a respective user (or group of users) to access the online service.

As part of setting up an account with an online service, a user can set a credential that is to be used to authorize the user's access of the online service. A credential can refer to any information that is provided to the online service to authorize access to the online service. As examples, a credential can include any or some combination of the following: a username or user identifier, a password, an access code (including a sequence of numbers or characters or a combination thereof), an access key, a session token, or other information. The user can set up respective credentials for accounts of different online services.

To provide strong security, it is desirable for a credential, such as a password, to be one that cannot be easily guessed by another person. The credential can be made more secure by making it long and complex (by mixing in combinations of lower case and upper case letters, characters, and/or symbols for example). However, such credentials can be difficult for a user to remember, especially when different credentials are used for different online services. In some cases, if a user has many accounts, the user may repeat the same credential for different accounts, or use credentials that are easier to remember, such as credentials that include a common word or include information about the user such as a birthday, the user's name, a relative's name, a pet name, and so forth. Using the same credential for multiple accounts or using credentials that are easy to guess can increase the likelihood of an unauthorized user hacking into the user's accounts.

In accordance with some implementations of the present disclosure, authentication techniques or mechanisms to manage secure access of online services by users include an account control service and a mobile application in a mobile device. In the present discussion, a user attempts to access an online service from a target device (which is separate from the account control service and the mobile device), and this access to the online service from the target device is based on use of the account control service and the mobile application in the mobile device. As examples, the target device used to access an online service can include any of the following: a desktop computer, a notebook computer, a tablet computer, a smart phone, a game appliance, a set-top box for a television, or any other electronic device. The mobile device that is used as part of the authentication techniques or mechanisms according to some implementations can include a device separate from the target device and that is carried around with the user. As examples, the mobile device can include any of the following: a smart phone, a wearable device (e.g., a smart watch, smart eyeglasses, etc.), a tablet computer, or any electronic device that is mobile and can be carried by the user to different locations as the user moves around.

The account control service is used to manage credentials of a user for accounts of different online services. The account control service can provide a centralized service with which a user can register accounts of the different online services. Registering an account of an online service with the account control service can include providing, to the account control service, information identifying the online service, and a credential to be used to access the online service. Multiple users can register their respective accounts of online services with the account control service.

In addition to using the account control service, the mobile device of the user is further used to control access to an online service. Based on the assumption that the user normally carries his or her mobile device on the user's person, proximity of the user's mobile device provides an indication that the user is close by and thus likely to be the person who is attempting to access the online service with the target device (that is separate from the mobile device). The detected proximity of the user's mobile device thus provides a verification of the user identity at the target device that is used to access the online service.

The mobile application in the mobile device can be used to register the user's credentials of accounts of different online services with the account control service. In addition, when the mobile device is within a communication range of a target device, the mobile device can provide a credential of an account of an online service to the target device, such that the target device can be used to access the online service by the user.

FIG. 1 is a block diagram of an example arrangement that includes a target device 102, a mobile device 104 (which is carried by a user 116), and an account control system 106 in which an account control service 108 is executed. The account control service 108 can include machine-readable instructions executable by a processor (or processors) in the account control system 106. The account control system 106 can be implemented with a computer or a distributed arrangement of computers. In some examples, the account control system 106 can be part of a cloud.

The account control system 106 can communicate with the mobile device 104 and the target device 102 over a network 110. The network 110 can be a public network such as the Internet, or a private network such as a local area network. The network 110 can include a wired network or a wireless network.

The target device 102 can be any electronic device that can be used to access a remote online service, such as any of online services 112 provided by respective application servers 114. The target device 102 can communicate with the application servers 114 over the network 110 or a different network(s). An application server 114 can include a computer or an arrangement of computers. An online service 112 can be implemented as machine-readable instructions executable on a processor (or processors) of the application server 114. In some examples, an online service 112 can be part of a website.

The target device 102 executes a target application 118, which can be implemented as machine-readable instructions executed on a processor (or processors) of the target device 102. In some examples, the target application 118 can be a web browser. In other examples, the target application 118 can be a different application that is useable to access a respective online service 112. The user 116 can use the target device 102 to access an online service 112.

The mobile device 104 includes a client application 120 including machine-readable instructions that are executable by a processor (or processors) in the mobile device 104.

Using the client application 120, the user 116 of the mobile device 104 can register accounts of different online services 112 with the account control service 108. The registration of the accounts of the different online services 112 can include the user providing credentials for the online service accounts to the account control service 108, which can store the credentials in a central repository on behalf of the user 116.

The target device 102 and the mobile device 104 each include a wireless interface 122 or 124, respectively, to perform wireless communications (e.g., radio frequency communications, infrared communications, acoustic communications, etc.). When the mobile device 104 comes within a communication range of the target device 102, the wireless interface 124 and the wireless interface 122 of the mobile device 104 and the target device 102, respectively, can start communicating with each other, so that the mobile device 104 can transmit a credential for an account of an online service 112 to the target device 102, which can be used by the target device 102 to access the online service 112.

In some examples, the wireless interfaces 122 and 124 perform short-range wireless communications, such as BLUETOOTH radio frequency communications, near field communication (NFC) electromagnetic induction communications, WI-FI wireless local area network (WLAN) communications, or any other type of wireless communications. With BLUETOOTH and NFC wireless communications, the mobile device 104 and the target device 102 are within a communication range of each other in response to the wireless interfaces 124 and 122 being able to detect transmitted signals from each other. With WI-FI communications, the mobile device 104 and the target device 102 are within a communication range of each other in response to the mobile device 104 and the target device 102 both being in a coverage area of an access point of the WI-FI WLAN, so that the mobile device 104 and the target device 102 can communicate with each other through the access point. More generally, the mobile device 104 and the target device 102 are within a communication range of each other in response to the mobile device 104 and the target device 102 being in proximity to each other such that they are able to communicate with each other, either directly or indirectly.

Although FIG. 1 shows one mobile device 104 associated with the user 116, it is noted that the user 116 may have multiple mobile devices, each loaded with a respective client application 120 that the user can use to perform registration of accounts of online services with the account control service 108. Each such mobile device can also be used to transmit a credential for an online service 112 to the target device 102 when the mobile device is within a communication range of the target device 102.

Also, although FIG. 1 shows one target device 102, it is noted that there can be multiple target devices that the user 116 can use to access any online service 112. For example, one target device may be the user's personal computer at the user's home. Another target device can be the user's work computer at the office. Yet another target device can be a public computer, such as a public computer located in a hotel, at an airport, or at some other location. As yet a further example, the target device 102 may be a target device owned by a friend or colleague of the user 116.

In addition, in further examples, multiple users (who have respective mobile devices similar to the mobile device 104) can use the account control service 108 and the target device 102 to access respective online services 112.

Once the client application 120 has registered the accounts of different online services with the account control service 108 using a registration process (or multiple registration processes) between the client application 120 and the account control service 108, the client application 120 can be placed into a state that allows the client application 120 to transmit, to the target device 102, a credential for a service 112 to be accessed from the target device 102.

Figure 2:
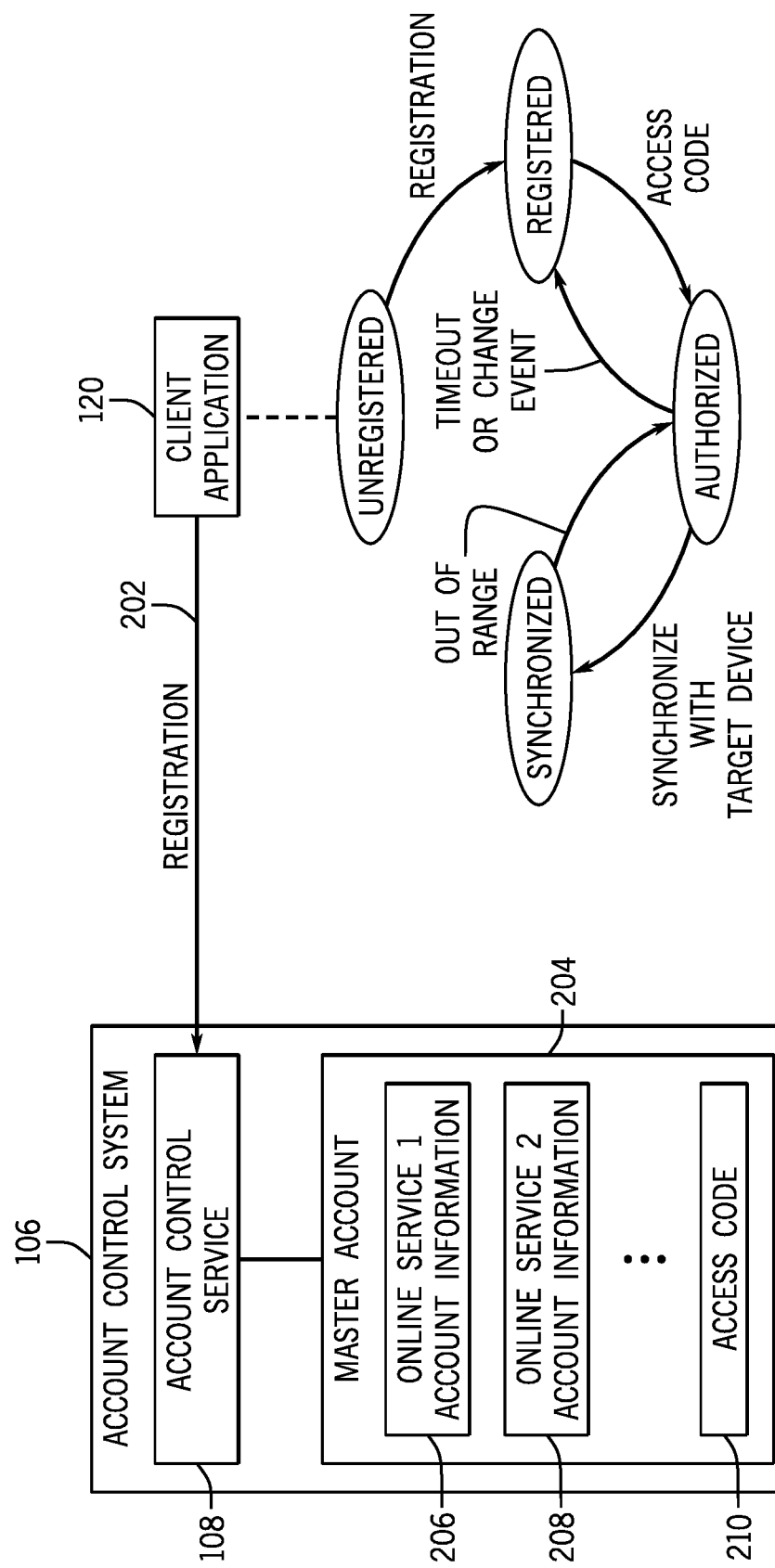
FIG. 2 illustrates registration by a client application with an account control service, and various states of the client application, in accordance with some examples.

In some examples, as shown in FIG. 2, the client application 120 can have several different states, including an unregistered state, a registered state, an authorized state, and a synchronized state. Although specific states are described, it is noted that in other examples, the client application 120 can have other states.

The unregistered state is a state of the client application 120 that the client application 120 starts at right after installation of the client application 120 into the mobile device 104.

The client application 120 transitions from the unregistered state to the registered state after the user performs a registration 202 (FIG. 2) with the account control service 108 to register the user's online service accounts with the account control service 108. Once the client application 120 has performed registration with respect to the account control service 108, the client application 120 remains in the registered state (i.e., the client application 120 does not transition back to the unregistered state unless the user 116 decides to unregister with the account control service 108).

The client application 120 can also include the authorized state and the synchronized state, which are discussed further below.

Initially, the user 116 can use the client application 120 to set up a master account 204 for the user 116 with the account control service 108. Different master accounts can be maintained by the account control service 108 for different users. The setup of the master account 204 can involve setting up a master credential (e.g., a username and password) for the master account 204. The master credential is used by the user 116 to log into the master account 204 to manage accounts of online services, such as to add a credential for an online service 112, to change a credential for an online service 112, or to delete a credential for an online service 112.

The registration 202 of the user's online service accounts with the account control service 108 can cause account information for the various online services to be stored in the master account 204 of the user 116, including an online service 1 account information 206 for a first online service, an online service 2 account information 208 for a second online service, and so forth. The account information for a respective online service stored in the master account 204 can include a credential for the online service account, and other information associated with the online service, such as the identifier of the online service. The account credentials set up by the user 116 for the respective online services 112 can be robust credentials that are distinct for different online services 112 and that are difficult to guess by hackers.

The registration of account information for different online services of the user 116 can occur at respective different times. For example, the user 116 can use the client application 120 to initially register a subset of the user's online service accounts with the account control service 108. The user 116 can at a later time perform a further registration process to register another online service account with the account control service 108.

The credential for an online service that can be stored in the master account 204 for transmission by the client application 120 to the target application 118 can be a username and password, for example. In other examples, other types of credentials can be used as part of other user authentication techniques. For example, a credential can include an access key, which can include a user secret that is generated by a machine, such as by the account control service 108 executed in the account control system 106. A user secret includes any information that is uniquely associated with a user. In some cases, an access key can include a pair of information elements, such as a user identifier and a user secret. Thus, the term "access key" can refer to a single information element, or to a pair (or other set) of information elements. Multiple access keys can be created that are associated with different permissions for accessing features of an online service.

In examples where an access key is used, as part of the registration 202 with the account control service 108, the user enters the user's username and password to authenticate to the account control service 108. The account control service 108 then generates a master access key (including, for example, a user identifier and a user secret) for the master account 204 that is provided to the mobile application 120 to use for later authentication to the account control service 108. The mobile application 120 stores the master access key for the master account 204, rather than storing the username and password for the master account 204.

Similarly, access keys can be used for the online services 112 rather than usernames and passwords. A user can store the username and the password for a particular online service 112 in the master account 204. In response, the account control service 108 can create an access key for the particular online service 112 that is provided to the client application 120. The client application 120 can transmit this online service access key to the target application 118 (instead of a username and password) for use by the target application 118 to create an active session with the particular online service 112.

In further examples, a session token can be used as a credential. A session token can be created based on a user identifier and user secret, or based on other information. The session token can have a specified lifetime—in other words, the session token is valid for a specified time duration after which the session token is no longer valid. With such examples, the mobile application 120 can send the session token to the target application 118 for use in accessing an online service 112.

As part of the registration 202 with the account control service 108, the client application 120 can also set up an access code (such as a personal identification number or other personal information) that the user 116 has to enter into the mobile device 104 to cause the client application 120 to transition from the registered state to the authorized state. In the authorized state, the mobile device 104 is authorized with respect to the account control service 108. Such an access code is stored as access code 210 in the master account 204. When the user 116 enters a valid access code (that matches the access code 210), then the client application 120 transitions to the authorized state.

In some examples, the client application 120 is not able to search for a target device 102 to connect to unless the mobile device 104 is in the authorized state. The client application 120 can remain in the authorized state until a specified event occurs. The specified event can be a timeout event that is generated in response to expiration of a specified time duration. Thus, once the client application 120 has transitioned to the authorized state, such as from the registered state, the client application 120 can remain in the authorized state. If no activity occurs during the specified time duration, then timeout occurs, and the client application 120 transitions from the authorized state back to the registered state. Another event that can cause the client application 120 to exit the authorized state is a change event, such as an event triggered in response to a detection of movement of the mobile device moving to a different location that is greater than some distance away from the target device 102 or that is out of the communication range of the target device 102.

When the client application 120 is in the authorized state, the client application 120 can search for a target device 102 to synchronize with, such that the client application 120 can synchronize with the target application 118. The client application 120 is able to detect the target device 102 when the client device 104 moves within a communication range of the target device 102. Once the client application 120 detects the target device 102 and connects with the target application 118 of the detected target device 102, the client application 120 transitions from the authorized state to the synchronized state. Establishing a connection between the client application 120 and the target application 118 can refer to the client application 120 and the target application 118 establishing a session such that the client application 120 and the target application 118 can communicate with each other, such as to allow the client application 120 to transmit a credential (e.g., a username and password, an access key, a session token, etc.) of an online service account to the target application 118, for use in accessing the online service 112.

In examples where short-range BLUETOOTH or NFC is used, the mobile device 104 and the target device 102 are in communication range when the mobile device 104 is within a specified short physical distance to the target device 102.

In further examples where longer range BLUETOOTH or WI-FI is used, the assumption can be made that when the mobile device 104 and the target device 102 can communicate with each other, they are in close proximity. In such further examples, a user can request access of a specific target device 102, such as by scanning a barcode (e.g., a quick response or QR code that is on the specific target device 102), or the user can manually enter a name or identifier of the specific target device 102.

In examples where WI-FI is used, when the mobile device 104 enters a WLAN, the mobile device 104 can send a message that is broadcast to devices on the WLAN to notify potential target devices of the presence of the mobile device 104.

In other examples, the mobile application 120 can also keep a list of previously synchronized target devices, favorite target devices, or nearby target devices that the mobile application 120 is allowed to synchronize with.

In some examples, the client application 120 can establish a connection with a module 119 (FIG. 1) that is linked to the target application 118. For example, if the target application 118 is a web browser, then the module 119 can be a plug-in module to the web browser. A plug-in module is a component including machine-readable instructions that can add additional functionality to another application, such as the target application 118. In other examples, the module 119 can be another type of module that can interact with the target application 118 for the purpose of allowing the client application 120 to communicate with the target application 118.

In further examples, the functionality provided by the module 119 can be included in the target application 118 itself.

In the present disclosure, reference to the target application 118 performing respective tasks can refer to either or both of the target application 118 or the module 119 performing the respective tasks.

Figure 3:
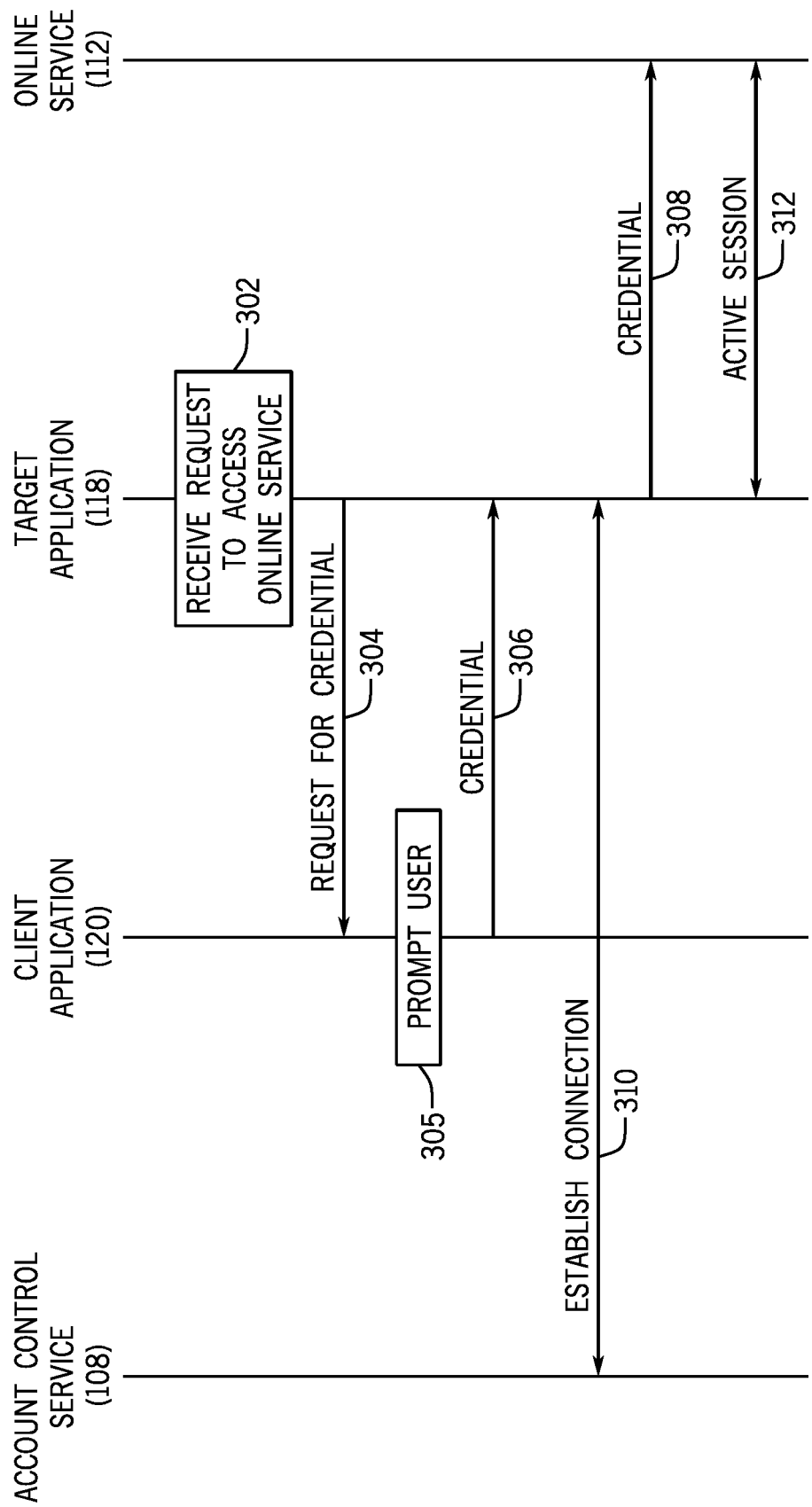
FIG. 3 is a flow diagram of a process performed by an account control service, a client application, and a target application, according to some examples.

FIG. 3 shows an example process that can be performed among the account control service 108, the client application 120, and the target application 118 to allow a user at the target device 102 (in which the target application 118 is executed) to access an online service 112. In the example of FIG. 3, it is assumed that the client application 120 has established a connection with the target application 118 (e.g., the client application 120 is in the synchronized state).

When the target application 118 receives (at 302) a request to access the online service 112 at a remote application server 114, such as in response to a user opening a web page of the online service 112 using the target application 118, the target application 118 can send (at 304) a request to the client application 120 for the credential of the account of the online service 112 to be accessed. In response to the request for the credential, the client application 120 can generate (at 305) a prompt to seek user confirmation that the client application 120 is allowed to send the credential to the target application 118. The prompt can be in the form of a dialog box with a control element activatable by the user to confirm that the user wishes to continue with establishing a session with the online service 112. The prompt can be generated in cases where the target device 102 is a public device or some other untrusted device. In other examples where the target device 102 is a trusted device, the prompt does not have to be presented to the user for confirmation of transmission of a credential to the target application 118. In response to receiving an indication that the target device 102 is a trusted device, the client application 120 can automatically send the respective credential to the target application 118 in response to the request for credential.

A trusted device can be configured using the mobile application 120, such as by entering identification information of the trusted device using the mobile application 120. Alternatively, a trusted device can be configured using the account control service 108, where the identification information of the trusted device can be added to the master account of the user. In some examples, for a particular online service (such as a banking service), certain target devices can be trusted while others cannot. For example, the user's personal computer at home can be a trusted device for accessing the banking service, while a work computer or a public computer would not be a trusted device for accessing the banking service.

If there are multiple online service accounts that the target application 118 is attempting to access, then the prompt presented (at 305) to the user can list the multiple online service accounts, and the user can choose the online service accounts for which the mobile application 120 is allowed to transmit respective credentials to the target application 118.

Next, the mobile application 120 sends (at 306) the requested credential(s) to the target application 118. The credential(s) that is (are) sent by the client application 120 to the target application 118 can be retrieved by the client application 120 from the user's master account at the account control service 108, or can be retrieved from a local cache of temporarily stored online service account information at the mobile device 104.

The target application 118 can then forward (at 308) the credential(s) to the online service 112 to allow an active session to be established (at 312) between the target application 118 and the online service 112.

Using techniques or mechanisms according to some implementations, the target application 118 at the target device 102 can be used to access online services 112 without the user having to manually enter credentials at the target device 102.

In some implementations, before the target application 118 establishes (at 312) the active session with the online service 112, the target application 118 establishes (at 310) a connection with the account control service 108 over the network 110. The target application 118 can transmit information about an active session (or multiple active sessions) established for a user between the target application 118 and a respective online service 112 (or multiple online services 112). The information about an active session can include an identifier of the active session, and parameters relating to attributes of the active session. Information about each active session being accessed by a given user can be stored in the master account associated with the given user at the account control service 108.

The connection between the target application 118 and the account control service 108 allows the account control service 108 to manage an active session between the target application 118 and the service 112. For example, the account control service 108 can notify the target application 118 to log out of the active session, or to modify some parameter associated with the active session. The account control service 108 can manage an active session between the target application 118 and a service 112 in response to a request received from the client application 120. As an example, the user 116 can use the client application 120 to send a request to the account control service 108, to cause the account control service 108 to send a command to the target application 118 to log out of the active session or to modify the active session (such as to modify a parameter of the active session).

In example use cases where the target device 102 is an untrusted device, the target application 118 can monitor for the presence of the mobile device 104 to ensure that the mobile device 104 remains within a communication range of the target device 102 while the active session is in progress. In such example use cases where the target device 102 is an untrusted device, the mobile device 104 moving out of the communication range of the target device 102 is a trigger for the target application 118 to log out of the active session between the target application 118 and the online service 112. The mobile device 104 moving out of the communication range of the target device 102 is an indication that the user is no longer physically at the target device 102, such that the active session should be terminated to avoid someone else from seeing the information of the active session after the user has left the target device 102.

If after the active session is terminated, the mobile device 104 moves into the range of the target device 102 again, the mobile application 120 can automatically synchronize with the target application 118 (to transition to the synchronized state discussed above), and the mobile application 120 can present to the user a prompt to confirm that the target application 118 is to log into the respective online service account again. If the user confirms, then the target application can restore a previous active session, and in some cases can even restore web pages that were being viewed.

In other use cases where the target device 102 is a trusted device, then the target application 118 can maintain the active session between the target application 118 and the online service 112 even if the mobile device 104 moves out of the communication range from the target device 102.

A user can also control, at the mobile device 104, an active session established between the target device 102 and an online service 112. The user can log into the user's master account (e.g., 204 in FIG. 2) using the client application 120 at the mobile device 104. The master account of the user can store session information relating to the active session(s) that the user is currently engaged in. The client application 120 can present a visualization of the active session(s) that is (are) currently in progress between the target device 102 and the online service(s) 112. The visualization can include control elements that are activatable by the user to control the active session(s). For example, one control element can be activated to terminate an active session, while another control element can be activated to modify an active session.

Activation of a control element in the visualization causes a corresponding indication to be sent to the account control service 108, which then sends a respective command to the target application 118 to cause the respective control action (e.g., terminate active session, modify active session) to be performed with respect to the active session.

The foregoing refers to use cases where one user can access an online service using either a trusted target device or an untrusted target device, by using the account control service 108 and the user's mobile device 120 to support authentication to the online service.

Figure 4:
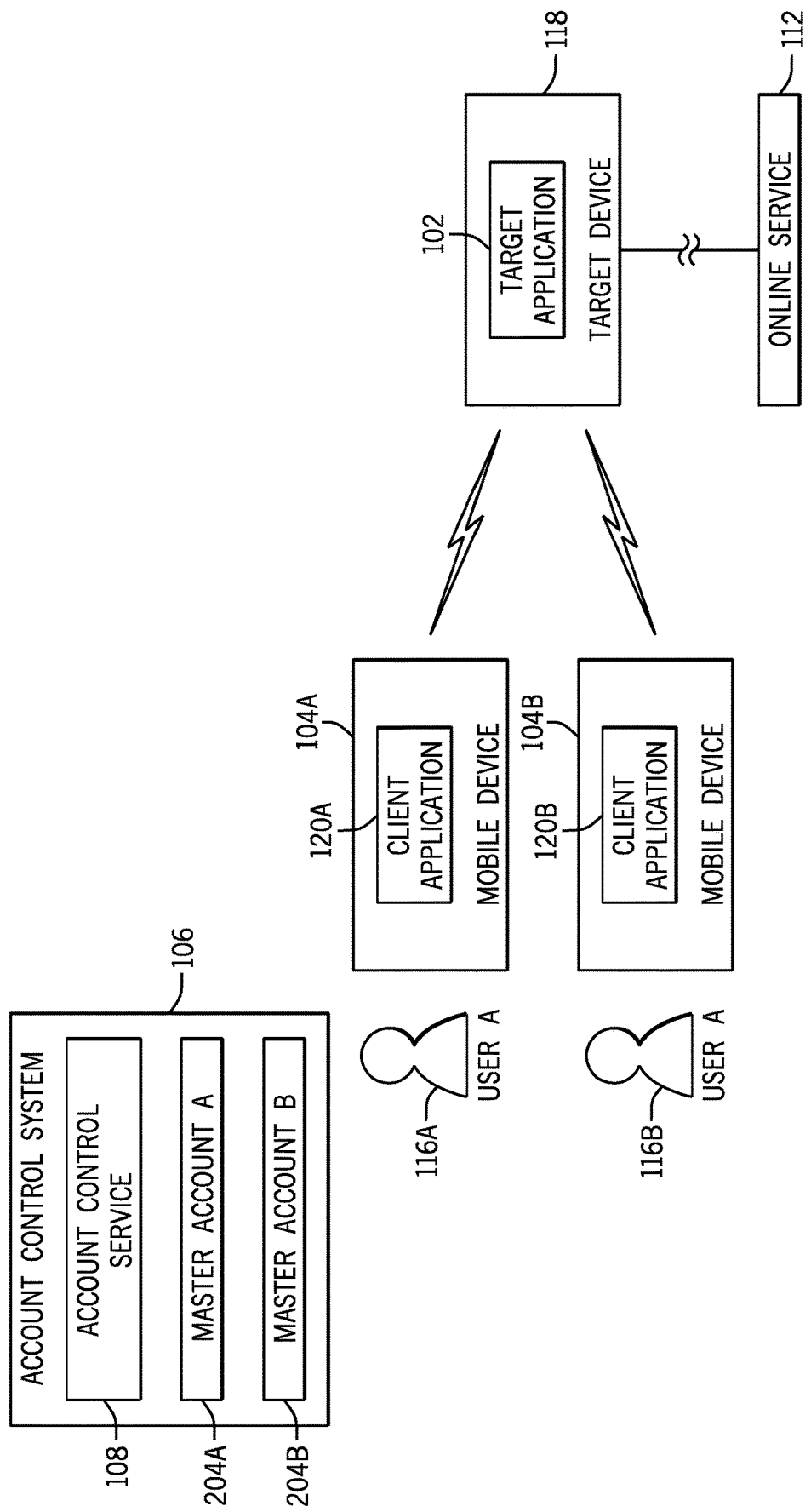
FIG. 4 is a block diagram of an arrangement in which multiple users can access the same target application, according to further examples.

In other example use cases, such as shown in FIG. 4, multiple users (e.g., user 116A and user 116B) that are associated with respective multiple mobile devices 104A and 1046 can connect to the same target application 118. As shown in FIG. 4, user 116A can use the client application 120A in the mobile device 104A to register account information for an online service 112 in a master account 204A maintained by the account control service 108 for user 116A, and user 116B can use the client application 120B in the mobile device 104B to register account information for the online service 112 in a master account 204B maintained by the account control service 108 for user 116B.

For example, the online service 112 can be an online game service, and the target device 102 can be a game console or another computer that allows multiple users to access the online game service to collaboratively play the online game.

As another example use case, the online service 112 can be a physician service, and a doctor can enter information into the physician service using the doctor's mobile device and the account control service 108 to support authentication to access the physician service. At a later time, a nurse can access the physician service using the nurse's mobile device and the account control service 108 to support authentication, for retrieving the information entered by the doctor.

Although FIG. 4 shows multiple users accessing the target device 102 to access one online service, note that in other example use cases, the multiple users can access the target device 102 to access multiple online services.

Figure 5:
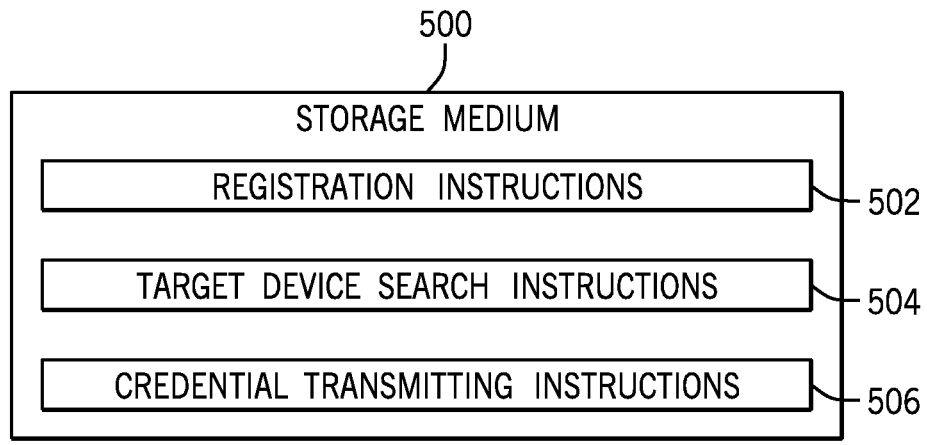
FIG. 5 is a block diagram of a storage medium storing machine-readable instructions in a mobile device, according to some examples.

FIG. 5 is a block diagram of a non-transitory machine-readable or computer-readable storage medium 500 that stores machine-readable instructions executable on a mobile device (e.g., the mobile device 104 or 104A or 104B discussed above) to perform various tasks according to the present disclosure.

The machine-readable instructions include registration instructions 502 to register an account of a first service (e.g., an online service 112) with an account control service (e.g., 108), where the account control service is separate from the first service. The machine-readable instructions further include target device search instructions 504 to, in response to the mobile device being authorized with respect to the account control service, search for a target device (e.g. 102) that is within a communication range of the mobile device. The machine-readable instructions further include credential transmitting instructions 506 to transmit, to the target device found in the search, a credential of the account of the first service being accessed by the target device over a network.

Figure 6:
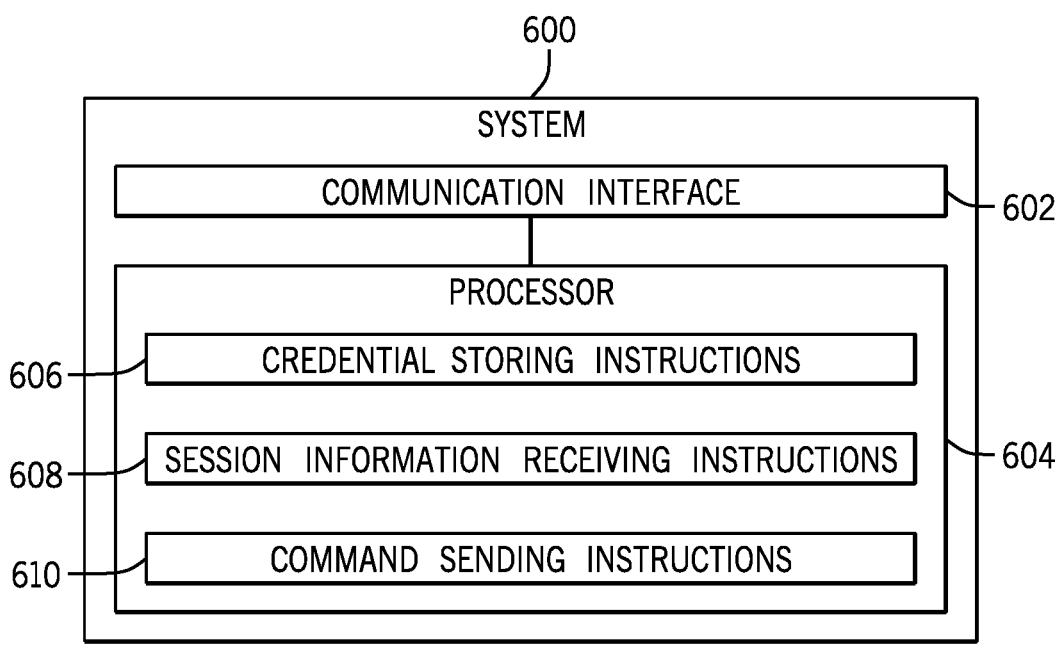
FIG. 6 is a block diagram of an account control system according to some examples.

FIG. 6 is a block diagram of an example system 600, which can be the account control system 106 discussed above. The system 600 includes a communication interface 602 to communicate with a network (e.g., network 110 in FIG. 1), and a processor 604 to execute credential storing instructions 606 to store, as part of a registration performed with a mobile device over the network, a credential of an account of a first service (e.g., an online service 112). The processor 604 is to further execute session information receiving instructions 608 to receive, from a target device (e.g., 102 discussed above) over the network, information relating to an active session at the target device that accesses the first service based on use of the credential. The processor 604 is to further execute command sending instructions 610 to, responsive to a request from the mobile device, send a command to the target device to perform session management of the active session, such as to terminate the active session or to modify the active session.

In the foregoing, the processor 604 executing the respective machine-readable instructions can refer to one processor executing the machine-readable instructions, or multiple processors executing the machine-readable instructions. A processor can include a microprocessor, a core of a multi-core microprocessor, a microcontroller, a programmable integrated circuit, a programmable gate array, or another hardware processing circuit, or any combination of the foregoing.

Figure 7:
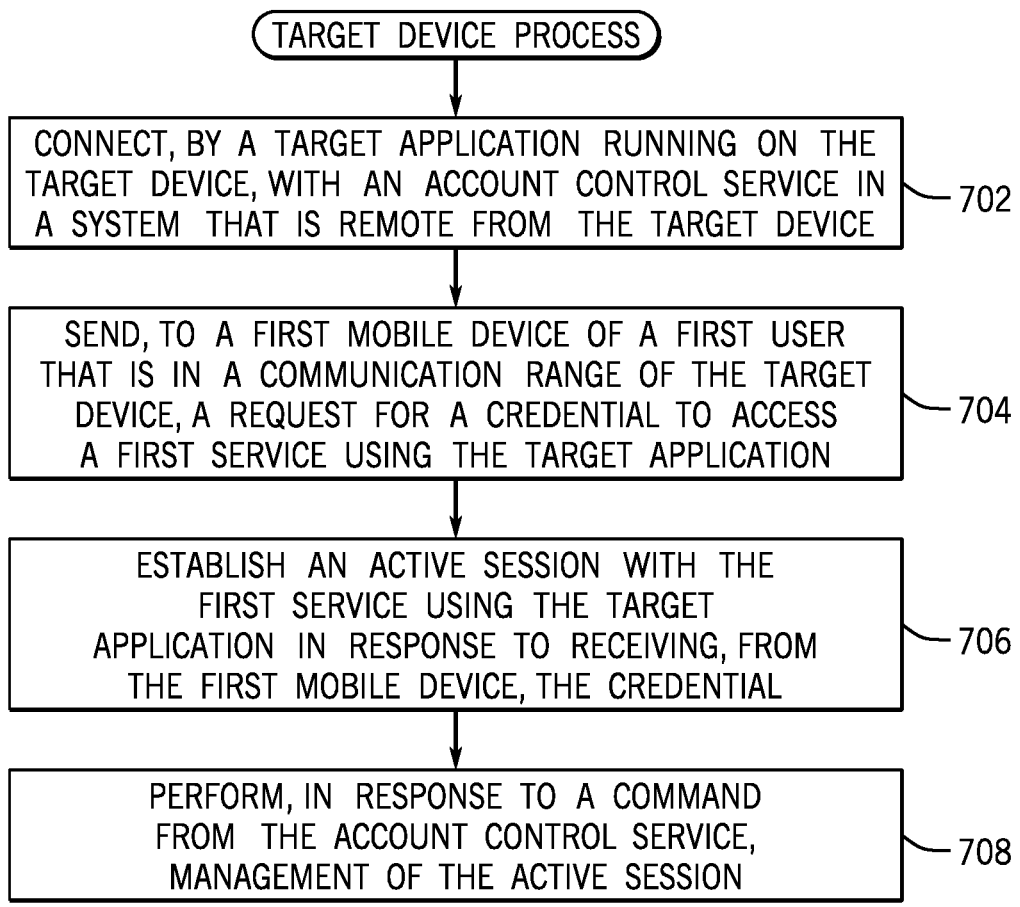
FIG. 7 is a flow diagram of a process performed by a target device, according to some examples.

FIG. 7 is a flow diagram of an example process that can be performed by a target device (e.g., 102). The process includes connecting (at 702), by a target application (e.g., 118) running on the target device, with an account control service (e.g., 108) in a system (e.g., the account control system 106) that is remote from the target device. The process includes sending (at 704), to a first mobile device (e.g., 104, 104A, or 104*b*) of a first user that is in a communication range of the target device, a request for a credential to access a first service (e.g., 112) using the target application. The process includes establishing (at 706) an active session with the first service using the target application in response to receiving, from the first mobile device, the credential. The process further includes performing (at 708), in response to a command from the account control service, management of the active session.

The storage medium 500 of FIG. 5 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a mobile device to:
 register an account of a first service with an account control service, the account control service separate from the first service;
 in response to the mobile device being authorized with respect to the account control service, search for a target device that is within a communication range of the mobile device; and
 transmit, to the target device found in the search, a credential of the account of the first service being accessed by the target device over a network.

2. The non-transitory machine-readable storage medium of claim 1, wherein the instructions upon execution cause the mobile device to transition to an authorized state where the mobile device is authorized with respect to the account control service, in response to receipt of a valid access code at the mobile device.

3. The non-transitory machine-readable storage medium of claim 2, wherein the instructions upon execution cause the mobile device to:
 responsive to a specified event, transition the mobile device from the authorized state to another state where the mobile device is not authorized with respect to the account control service.

4. The non-transitory machine-readable storage medium of claim 1, wherein the instructions upon execution cause the mobile device to:
 register an account of a second service with the account control service, the registering of the account of the second service comprising providing a credential for the account of the second service to the account control service;
 prompt a user to confirm which of the credentials of the accounts of the first and second services the mobile device is authorized to send to the target device.

5. The non-transitory machine-readable storage medium of claim 1, wherein the instructions upon execution cause the mobile device to:
 responsive to an indication that the target device is a trusted device, allowing the transmitting of the credential of the account of the first service to the target device without first prompting the user for confirmation.

6. The non-transitory machine-readable storage medium of claim 1, wherein transmitting the credential of the account of the first service to the target device comprises transmitting the credential of the account of the first service to a module associated with a target application at the target device, the target application used to access the first service.

7. The non-transitory machine-readable storage medium of claim 6, wherein the target application comprises a web browser, and the module is a plug-in module to the web browser.

8. A system comprising:
 a communication interface to communicate with a network; and
 a processor to:
  register, from a mobile device, an account of a first service with an account control service, the account control service separate from the first service;
  store, as part of the registration of the account performed with mobile device over the network, a credential of the account of the first service;
  in response to the registration of the account, search for a target device that is within a communication range of the mobile device;
  receive, from the target device over the network, information relating to an active session at the target device that accesses the first service based on use of the credential, wherein the target device is within the communication range of the mobile device; and
  responsive to a request from the mobile device, send a command to the target device to perform session management of the active session.

9. The system of claim 8, wherein the processor is to further:
 store, as part of the registration, a credential of an account of a second service; and receive, from the target device over the network, information relating to another active session at the target device that accesses the second service based on use of the credential of the account of the second service.

10. The system of claim 8, wherein the first service is provided by a server that is separate from the system.

11. The system of claim 8, further comprising a non-transitory storage medium storing account control instructions executable on the processor to:

as part of the registration, set up, with the mobile device, an access code associated with the account control instructions, the access code useable by the mobile device to authorize the mobile device to connect with the target device.

12. A method of a target device, comprising:

registering, from a first mobile device, an account of a first service with an account control service, the account control service separate from the first service;

in response to the registration of the account of the first service, searching for a target device that is within a communication range of the first mobile device;

connecting, by a target application running on the target device, with the account control service in a system that is remote from the target device;

sending, to the first mobile device of a first user that is in a communication range of the target device, a request for a credential to access the first service using the target application;

establishing an active session with the first service using the target application in response to receiving, from the first mobile device, the credential; and performing, in response to a command from the account control service, management of the active session.

13. The method of claim 12, further comprising:

sending, by the target device to the account control service, session information of the active session to allow the account control service to manage the active session.

14. The method of claim 12, further comprising:

sending, by the target device to a second mobile device of a second user, a request for a second credential to access a given service using the target application, the given service being the first service or a second service;

establishing an active session with the given service using the target application in response to receiving, from the second mobile device, the second credential.

15. The method of claim 12, further comprising:

detecting, by the target device, that the first mobile device has moved out of the communication range with the target device; and in response to the detecting, terminating the active session.

* * * * *